May 8, 1923.
L. W. SHIELDS
BELT BUCKLE
Filed May 8, 1922
1,454,522
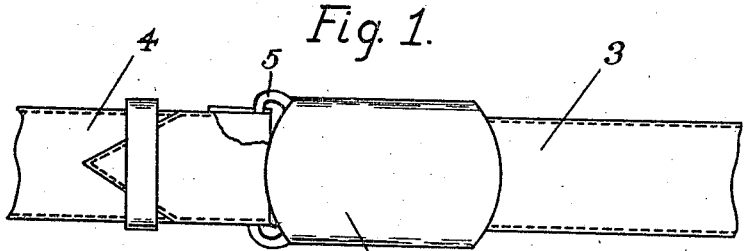
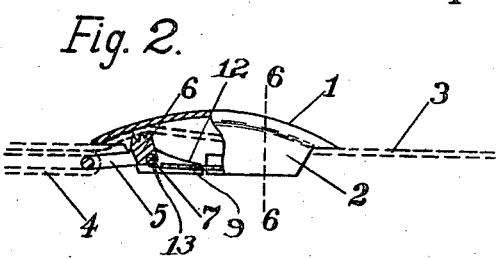
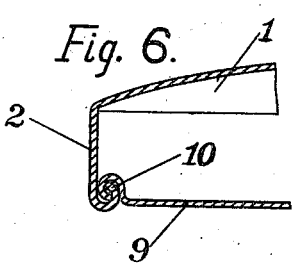
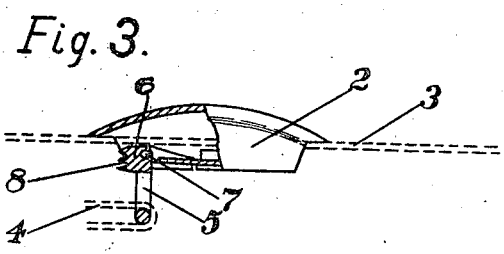
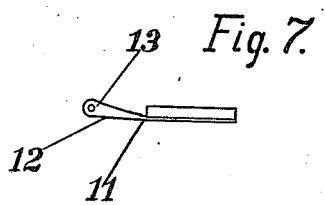
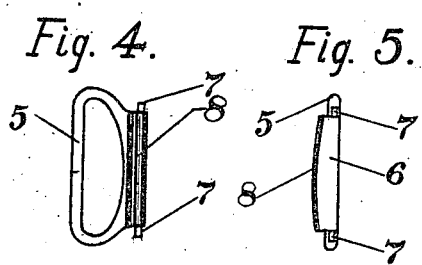
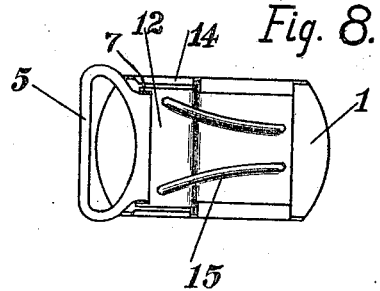
INVENTOR.
Lowell W Shields
BY
Davis & Simms
his ATTORNEYS.

Patented May 8, 1923.

1,454,522

UNITED STATES PATENT OFFICE.

LOWELL W. SHIELDS, OF ROCHESTER, NEW YORK, ASSIGNOR TO HICKOK MANUFACTURING COMPANY, INC., OF ROCHESTER, NEW YORK, A CORPORATION OF NEW YORK.

BELT BUCKLE.

Application filed May 8, 1922. Serial No. 559,177.

*To all whom it may concern:*

Be it known that I, LOWELL W. SHIELDS, a citizen of the United States, and resident of Rochester, in the county of Monroe and State of New York, have invented certain new and useful Improvements in Belt Buckles, of which the following is a specification.

The present invention relates to belt buckles and more particularly to the type in which a pivoted clamping member is provided which has its axis of turning movable toward and from a clamping surface on the buckle frame in order to accommodate belts of different thicknesses. Another object of the invention is to provide for resiliently supporting a pivotally mounted clamping member with reference to a clamping surface, so that the axis of turning of the clamping member may move toward and from the clamping surface, in order to accommodate belts of different thicknesses.

To these and other ends, the invention consists of certain parts and combinations of parts, all of which will be hereinafter described; the novel features being pointed out in the appended claims.

In the drawings:

Fig. 1 is a front view of the fragment of the belt with the present embodiment of the invention secured thereto;

Fig. 2 is a view partially in section showing the clamping member in clamping position.

Fig. 3 is a view partially in section showing the clamping member moved to release the belt end;

Fig. 4 is a face view of the clamping member;

Fig. 5 is an end view of the clamping member;

Fig. 6 is an enlarged fragmentary section on the line 6—6, Fig 2;

Fig. 7 is a side view of the member which supports the clamping member; and

Fig. 8 is a rear view of the buckle.

Referring more particularly to the drawing, 1 indicates the front plate and 2 the side flanges formed, in this instance, in one piece with the front plate. The rear face of the front plate acts as a clamping surface for one end 3 of a belt. The other end 4 of the belt is secured, in this instance, to a loop or belt attaching member 5 which is formed, preferably integrally with a clamping member 6, the latter being pivoted at 7, so as to permit the serrated or tooth face 8 of the clamping member to move toward and from the rear face of the front plate 1. These teeth are arranged at different distances from the axis of turning of the clamping member, so that the one nearest the axis of turning, first engages the belt and then successively the other teeth cooperate with the belt.

In order that the axis of turning of the clamping member may shift with reference to the clamping surface on the rear face of the front plate 1, the clamping member is resiliently supported. This result is secured, in this instance, by providing a supporting plate 9, which has seamed connections 10 with the side flanges 2 adjacent one end of the buckle, the plate projecting beyond said seamed connections and being slightly bent or deflected at 11 to provide beyond said bend, a resilient tongue 12 to which the clamping member is pivotally connected, preferably by providing ears 13, at opposite sides of the tongue, operating between the side flanges, said ears receiving the pivot 7 of the clamping member. The supporting plate has pressed ribs 15 extending from its rigidly secured portion onto its resilient supporting portions to strengthen the plate while providing against too great a resiliency. The side flanges 2 are provided with small inwardly turned lugs or ribs 14 which form surfaces to prevent the cutting of the garments.

The operation of the invention will be understood from the foregoing description, but it may be summarized as follows: The belt end 3 is passed between the clamping member and the rear face of the front plate, while the parts are in the position shown in Fig. 3. The clamping member is then swung to the position shown in Fig. 2 and the resiliently mounted portion of the supporting plate shifts relatively to the rigidly secured portion and permits the clamping member to accommodate itself to the thickness of the belt end. This arrangement prevents the undue marring of the rear face of the belt and, at the same time, prevents slipping of the belt.

From the foregoing it will be seen that there has been provided a belt buckle in which a pivoted clamping member is resiliently supported so as to move toward and from the clamping surface. This clamping member is mounted upon a supporting plate which has a portion rigidly connecting the side flanges extending from a front plate. The supporting plate projects beyond said rigidly secured portions to provide a resilient portion on which the clamping member is preferably mounted.

What I claim as my invention and desire to secure by Letters Patent is:

1. A belt buckle comprising a front plate, the rear surface of which forms a clamping surface, side flanges projecting rearwardly from the upper and lower edges of said front plate, a supporting member rigidly connecting said side flanges and spaced from the front plate to permit the belt end to be passed between the member and the front plate, and a pivotally mounted clamping member yieldingly supported by said supporting member and arranged to cooperate with the rear face of the front plate between the side flanges.

2. A belt buckle comprising a front plate having side flanges, and a pivotally mounted clamping member, yieldingly supported from said side flanges and having belt anchoring means connected thereto.

3. A belt buckle comprising a front plate, side flanges projected rearwardly from said front plate, a supporting plate connected to both of said side flanges and having a yieldingly mounted portion, and a clamping member pivotally mounted on the yieldingly mounted portion and adapted to cooperate with the rear face of said front plate.

4. A belt buckle comprising a front plate, side flanges projecting rearwardly from said front plate, a supporting plate secured to both of said side flanges and having a yielding portion projecting therefrom, free from, but between said side flanges and a pivotally mounted clamping member mounted on said yielding portion and adapted to cooperate with the rear face of the said front plate.

LOWELL W. SHIELDS.